United States Patent
Peterson et al.

(10) Patent No.: US 12,011,678 B2
(45) Date of Patent: Jun. 18, 2024

(54) PHOTOACTIVE SEPARATION OF SOLUTES

(71) Applicant: Battelle Memorial Institute, Columbus, OH (US)

(72) Inventors: Rick Peterson, Columbus, OH (US); Steven M. Risser, Reynoldsburg, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 686 days.

(21) Appl. No.: 17/057,388

(22) PCT Filed: May 31, 2019

(86) PCT No.: PCT/US2019/034842
§ 371 (c)(1),
(2) Date: Nov. 20, 2020

(87) PCT Pub. No.: WO2019/232325
PCT Pub. Date: Dec. 5, 2019

(65) Prior Publication Data
US 2021/0197099 A1     Jul. 1, 2021

Related U.S. Application Data

(60) Provisional application No. 62/678,399, filed on May 31, 2018.

(51) Int. Cl.
*C02F 1/30*     (2023.01)
*B01D 11/04*     (2006.01)
(Continued)

(52) U.S. Cl.
CPC .......... *B01D 11/0492* (2013.01); *C02F 1/265* (2013.01); *C02F 1/30* (2013.01);
(Continued)

(58) Field of Classification Search
CPC . B01D 11/0492; B01D 15/3871; C02F 1/265; C02F 1/30; C02F 1/683
See application file for complete search history.

(56) References Cited

U.S. PATENT DOCUMENTS 6,162,881 A * 12/2000 Schon .................... B33Y 70/00
                                                                       522/31
2005/0258107 A1    11/2005 Leet et al.
(Continued)

FOREIGN PATENT DOCUMENTS

JP           2018012082 A   *   1/2018
WO       WO-0196010 A1 * 12/2001 ............. A01N 25/28
(Continued)

OTHER PUBLICATIONS

Evgenii Titov, Liudmila Lysyakova, Nino Lomadze, Andrei V. Kabashin, Peter Saalfrank, and Svetlana Santer, The Journal of Physical Chemistry C , 2015 119 (30), 17369-17377 DOI: 10.1021/acs.jpcc.5b02473 (Year: 2015).*
(Continued)

*Primary Examiner* — Chester T Barry
(74) *Attorney, Agent, or Firm* — Lippes Mathias LLP

(57) ABSTRACT

Disclosed are methods of separating solute from solvent using a photoactive extractant. The photoactive extractant can be switched between two states by exposure to light. This can change the affinity of the photoactive extractant for either the solute or the solvent, causing absorption of the solute or solvent. The photoactive extractant can then be separated from the fluid stream containing the solute or solvent. The absorbed solute or solvent is then separated from the photoactive extractant. The photoactive extractant is a photoisomer. Applications for these methods include desalination, water purification, and metal extraction.

18 Claims, 6 Drawing Sheets

(51) Int. Cl.
*C02F 1/26* (2023.01)
*C02F 1/00* (2023.01)
*C02F 101/12* (2006.01)
*C02F 101/20* (2006.01)
*C02F 103/08* (2006.01)

(52) U.S. Cl.
CPC .... *C02F 2001/007* (2013.01); *C02F 2101/12* (2013.01); *C02F 2101/20* (2013.01); *C02F 2103/08* (2013.01); *C02F 2303/16* (2013.01); *C02F 2303/18* (2013.01)

(56) References Cited

U.S. PATENT DOCUMENTS

| | | | |
|---|---|---|---|
| 2016/0245772 A1* | 8/2016 | Anderson | B05D 3/065 |
| 2019/0152993 A1* | 5/2019 | Warner | B01D 69/02 |
| 2019/0202194 A1* | 7/2019 | Ikeda | B41M 1/06 |
| 2020/0158948 A1* | 5/2020 | Westerhoff | C02F 1/285 |

FOREIGN PATENT DOCUMENTS

| | | | |
|---|---|---|---|
| WO | WO 2013/185002 A1 | 12/2013 | |
| WO | WO-2013185002 A1 * | 12/2013 | ............... C02F 1/32 |

OTHER PUBLICATIONS

U.S. Appl. No. 62/678,399, filed May 31, 2018 (specification only, no drawings) (Year: 2021).*
International Search Report dated Sep. 18, 2019 from PCT/US2019/034842.
Fujiwara, et al. "Photo Induced Membrane Separation for Water Purification and Desalination Using Azobenzene Modified Anodized Alumina Membranes" National Institute of Advanced Industrial Science and Technology, vol. 9, No. 6, Jun. 23, 2015, pp. 5705-5712.
Kulawardana, et al, "Photoresponsive oil sorbers: Photoresponsive Oil Sorbers", Journal of Polymer Science Part A: Polymer Chemsitry, vol. 48, No. 1, Nov. 24, 2009, pp. 55-62.

* cited by examiner

PHOTOACTIVE SEPARATION OF SOLUTES

CROSS-REFERENCE TO RELATED APPLICATIONS

This application claims priority to U.S. Provisional Patent Application Ser. No. 62/678,399, filed May 31, 2018, the contents of which are incorporated fully by reference herein.

BACKGROUND

The present disclosure relates to systems and methods for separating the solvent and solutes in a liquid or gaseous feed stream, to recover a product stream containing enriched amounts of the solvent or solute as desired. Such systems and methods are contemplated to be useful in desalination of saltwater or brines. The purification is performed using a photoactive organic phase that changes its affinity for target solvents or solutes upon exposure to certain wavelengths of light, and eliminates the need for the solvent to change phase (i.e. via evaporation or freezing), lowering the overall energy consumption when compared with traditional water extraction processes.

Conventional water purification systems and processes use various thermal and/or osmotic processing methods to remove solutes, such as salt, from water feeds. Conventional thermal processing methods typically force the water to undergo a phase change, such as distillation (e.g. multiple stage flash, vacuum, etc.); mechanical vapor recompression; thermal vapor recompression; and/or single or multi-stage evaporation, to separate the water from the solutes. Osmotic processing methods typically require applying high pressures and use complex arrangements of pumps, valves, bypasses, and membranes. As a result, these methods often require complex equipment and result in high energy consumption. In the case where solar desalination is desired, such as in remote or contingency operations with little access to utilities, thermal systems require conversion of solar inputs to heat, while osmotic systems typically require conversion to electricity, both of which reduce the overall solar efficiency.

There remains a need for less complex approaches to water purification that can operate at reduced pressures, at lower temperatures, or at higher efficiencies, and thus have reduced overall system energy or fuel consumption.

BRIEF DESCRIPTION

The present disclosure presents photoactive water extraction approaches which meet these needs. Disclosed in various embodiments herein are systems and methods for purifying liquid streams in which a photoactive extractant and light are used to remove solutes from the liquid streams. The photoactive extractants disclosed herein undergo photoisomerization, thereby changing the affinity of the extractant to water or target solutes, which permits the purification of these liquid streams without having the liquid streams undergo a phase change.

Disclosed herein are systems for purifying a first fluid stream having a liquid component and an impurity (i.e. solute) to obtain a purified fluid stream, the method comprising: (a) an initial stage having inlets for receiving a photoactive solvent and the first fluid stream, and a means for mixing the first fluid stream and solvent to form a heterogeneous mixture, wherein the photoactive solvent has a relaxed photoactive extractant; (b) an intermediate stage having a light source, wherein exposing the heterogeneous mixture to light from the light source forms an activated mixture comprising an activated photoactive extractant; and (c) a final stage for separating a concentrated impurity stream from the activated mixture to form an activated organic fluid stream, a means for separating the photoactive solvent from the absorbed solute to form the purified fluid stream, and an outlet for outputting the purified fluid stream.

The photoactive extractant undergoes photoisomerization when exposed to certain wavelengths of light. In its relaxed state, the extractant has a first aqueous solubility. After being exposed to light, the relaxed photoactive extractant becomes an activate extractant with a second aqueous solubility. In particular embodiments, the first aqueous solubility is less than the second aqueous solubility.

In some embodiments, each of the initial, intermediate, and final stages may have one or more additional inlets and outlets to accommodate the flow of fluids and mixtures through the system. In other embodiments, one or more of the initial, intermediate, and final stages may be combined into a single stage.

In further embodiments, the initial stage may be a mixing tank, the intermediate stage may be a solar exchanger, the light source may be the sun, and the final stage comprises a first settler for separating the concentrated impurity stream (i.e. containing the concentrated impurity from the first fluid stream) from the activated mixture to form an activated organic fluid stream that contains photoactive solvent and absorbed fluid, and a second settler for separating the photoactive solvent from the purified fluid stream.

Also disclosed are methods of purifying a first fluid stream having a liquid component and an impurity to obtain a purified fluid stream, comprising: (a) contacting the first fluid stream with an organic phase that contains a photoactive solvent to form a heterogeneous mixture, wherein the photoactive solvent comprises a relaxed photoactive extractant having a first aqueous solubility; (b) exposing the heterogeneous mixture to light having a first wavelength to obtain an activated mixture, wherein the activated mixture comprises an activated photoactive extractant having a second aqueous solubility; (c) separating the activated mixture into an organic phase and an aqueous phase; (d) transforming the activated photoactive extractant in the organic phase back into a relaxed photoactive extractant; and (e) separating the organic phase from the released aqueous liquid to obtain the purified fluid stream.

The activated photoactive extractant is a photoisomer of the relaxed photoactive extractant, and the first aqueous solubility is less than the second aqueous solubility.

In particular embodiments, a portion of the aqueous liquid component of the first fluid stream is absorbed by the photoactive solvent (i.e. via the increased aqueous solubility of the activated photoactive extractant), leaving a high concentration of the solutes/impurities in the un-absorbed portion of the first fluid stream, which can then be discarded.

The photoactive extractant can be an azobenzene, a stilbene, or a diarylethene. In particular embodiments, the aqueous liquid component is water, and the solute is salt.

The activated photoactive extractant is transformed back into the relaxed photoactive extractant by: removing the activated photoactive extractant from exposure to the light having the first wavelength; exposing the activated photoactive extractant to light having a second wavelength that is different from the first wavelength; or changing the temperature of the organic phase. The first wavelength may be different from the second wavelength by at least 50 nm.

In some embodiments, the organic phase is passed through a heat exchanger prior to transforming the activated photoactive extractant in the organic phase back into the relaxed photoactive extractant.

In some embodiments, the concentration of the solute in the purified fluid stream is at least 10 times lower than the concentration of the solute in the first fluid stream.

The first aqueous solubility of the relaxed photoactive extractant may be different from the second aqueous solubility of the activated photoactive extractant by at least 5 milliliters (mL) water per liter (L) extractant.

Also disclosed are methods of capturing a solute from a first fluid stream, comprising: (A) contacting the first fluid stream with a relaxed photoactive extractant having a first binding affinity for the solute; (B) exposing the relaxed photoactive extractant to light having a first wavelength, which changes the relaxed photoactive extractant into an activated photoactive extractant having a second binding affinity for the solute that is greater than the first binding affinity, such that at least a portion of the solute is absorbed by the activated photoactive extractant; (C) separating the photoactive extractant from the first fluid stream; and (D) stripping the absorbed solute from the photoactive extractant to obtain the captured solute.

Also disclosed are methods of capturing a solute that is present in a first fluid stream, comprising: (A) contacting the first fluid stream with a relaxed photoactive extractant having a first binding affinity for the solute, such that at least a portion of the solute is absorbed by the relaxed photoactive extractant; (B) separating the photoactive extractant from the first fluid stream; and (C) exposing the relaxed photoactive extractant to light having a first wavelength, which changes the relaxed photoactive extractant into an activated photoactive extractant having a second binding affinity for the solute that is less than the first binding affinity, such that the absorbed solute is stripped from the photoactive extractant to obtain the captured solute.

The solute may be a metal species. The photoactive extractant can be fixed upon a support. The first fluid stream can be a liquid or a gas. The photoactive extractant may be a solid.

Also disclosed herein generally are systems for separating a solute from a first fluid stream, comprising: (A) a source for a photoactive extractant; (B) a mixing stage for receiving and mixing the photoactive extractant with the first fluid stream to form a mixture; (C) a light exposure stage; and (D) a first separation stage.

In some embodiments, the light exposure stage is upstream of the first separation stage. In these embodiments, the photoactive extractant has a first aqueous solubility in a relaxed state and a second aqueous solubility in an activated state, wherein the second aqueous solubility is greater than the first aqueous solubility. Exposing the photoactive extractant to light changes the photoactive extractant into the activated state, such that the activated photoactive extractant absorbs at least a portion of an aqueous liquid component in the first fluid stream. The first separation stage is used to separate the first fluid stream from the photoactive extractant.

The system can further comprise a second separation stage which separates the absorbed portion of the aqueous liquid component from the photoactive extractant. The system can further comprise a heat exchanger between the first separation stage and the second separation stage.

In other embodiments, the light exposure stage is downstream of the first separation stage. In these embodiments, the photoactive extractant has a first binding affinity for the solute in a relaxed state and a second binding affinity for the solute in an activated state, wherein the second binding affinity is less than the first binding affinity; and the photoactive extractant absorbs at least a portion of the solute in the mixing stage. The first separation stage is used to separate the first fluid stream from the photoactive extractant. Exposing the photoactive extractant to light changes the photoactive extractant into the activated state, such that the activated photoactive extractant releases the solute.

These and other non-limiting aspects of the disclosure are further discussed herein.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
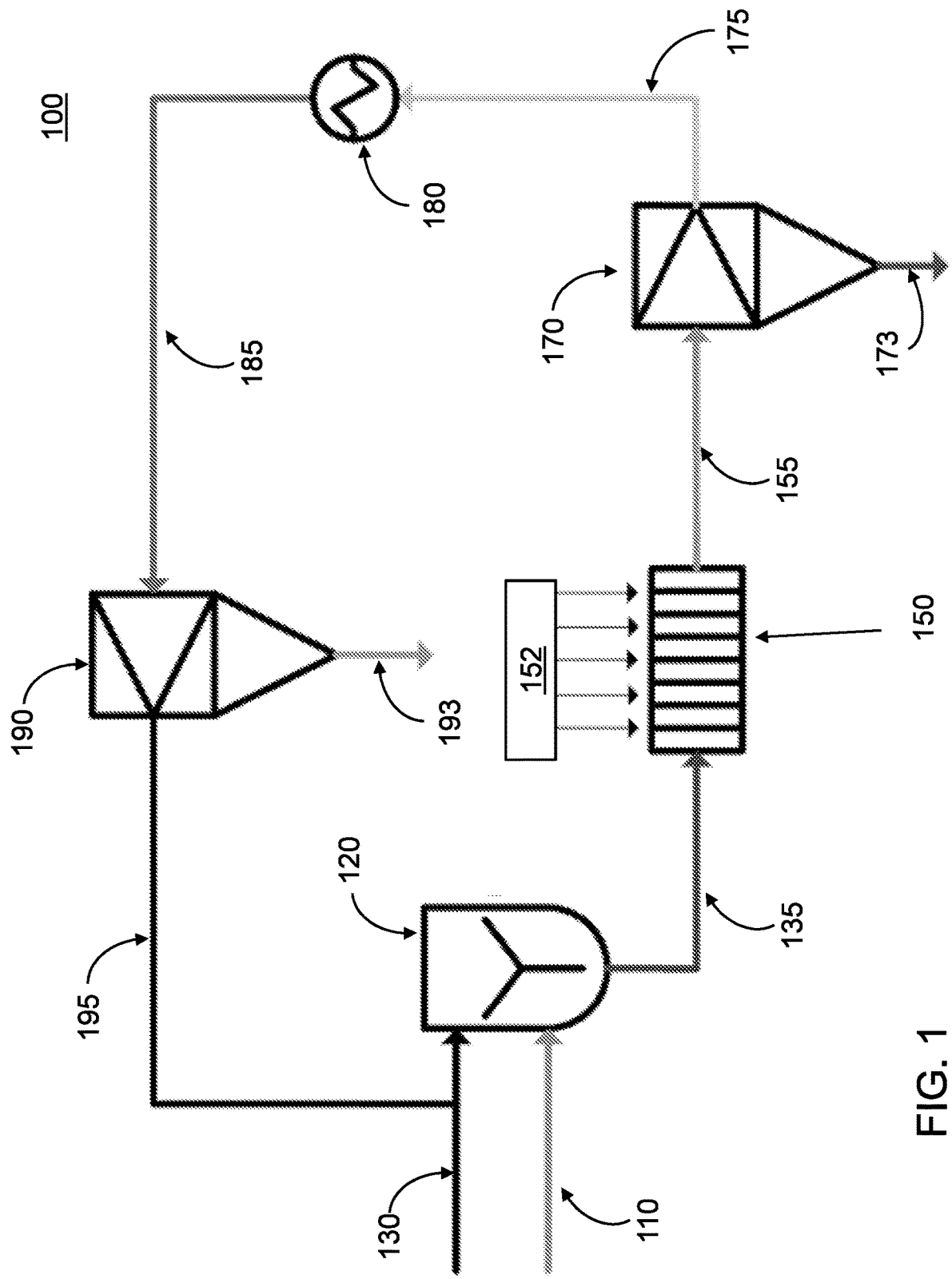
FIG. 1 illustrates a schematic for one embodiment of the present disclosure, where light exposure causes capture of an aqueous phase.

The present disclosure may be understood more readily by reference to the following detailed description of desired embodiments and the examples included therein. In the following specification and the claims which follow, reference will be made to a number of terms which shall be defined to have the following meanings.

Definitions

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

The term "comprising" is used herein as requiring the presence of the named components/steps and allowing the presence of other components/steps. The term "comprising" should be construed to include the term "consisting of", which allows the presence of only the named components/steps.

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

The modifier "about" used in connection with a quantity is inclusive of the stated value and has the meaning dictated by the context. When used in the context of a range, the modifier "about" should also be considered as disclosing the range defined by the absolute values of the two endpoints. For example, the range of "from about 2 to about 10" also discloses the range "from 2 to 10." The term "about" may refer to plus or minus 10% of the indicated number. For example, "about 10%" may indicate a range of 9% to 11%, and "about 1" may mean from 0.9-1.1.

The term "aqueous solubility" as used herein is used to refer to the amount of water that can be dissolved in another compound. This term is not used to refer to the amount of solute that can be dissolved in water.

Compounds are described using standard nomenclature. Any position not substituted by an indicated group is understood to have its valency filled by a bond or a hydrogen atom. A dash ("-") that is not between two letters indicates a point of attachment for a substituent, e.g. —CHO attaches through the carbon atom.

The term "alkyl" as used herein refers to a radical which is composed entirely of carbon atoms and hydrogen atoms which is fully saturated. The alkyl radical may be linear, branched, or cyclic. Linear alkyl radicals generally have the formula —$C_nH_{2n+1}$.

The term "alkoxy" refers to an alkyl radical which is attached to an oxygen atom, i.e. —O—$C_nH_{2n+1}$.

A "hydroxyl" radical has the formula —OH, with the oxygen atom bonded to a carbon atom. A "carboxy" or "carboxyl" radical has the formula —COOH, with the carbon atom bonded to another carbon atom. A carboxyl group can be considered as having a hydroxyl group. However, please note that a carboxyl group participates in certain reactions differently from a hydroxyl group.

The term "halogen" refers to fluorine, chlorine, bromine, and iodine. The term "halo" means that the substituent to which the prefix is attached is substituted with one or more independently selected halogen radicals.

The term "amino" refers to a radical of the formula R—$NH_2$, wherein R is a carbon atom.

The term "nitro" refers to a radical of the formula —$NO_2$.

The term "aryl" refers to an aromatic radical composed of carbon atoms and hydrogen atoms. When aryl is described in connection with a numerical range of carbon atoms, it should not be construed as including substituted aromatic radicals. For example, the phrase "aryl containing from 6 to 10 carbon atoms" should be construed as referring to a phenyl group (6 carbon atoms) or a naphthyl group (10 carbon atoms) only, and should not be construed as including a methylphenyl group (7 carbon atoms).

The term "organophosphate" refers to a radical of the formula O=P(OR)$_3$, where each R is a hydrogen atom or alkyl.

The term "phosphinate" refers to a radical of the formula O=P(OR)$R_2$, wherein each R is a hydrogen atom or alkyl.

The term "phosphonate" refers to a radical of the formula O=P(OR)$_2$R, wherein each R is a hydrogen atom or alkyl.

The term "ester" refers to a radical of the formula —CO—O—, wherein the carbon atom and the oxygen atom are both covalently bonded to carbon atoms.

The term "ether" refers to a radical of the formula —R—O—R'—, wherein the oxygen atom is covalently bonded to two other carbon atoms.

The term "ketone" refers to a carbonyl group (—CO—) that is bonded to two other carbon atoms (i.e. —R—CO—R'—). The two other carbon atoms can be in an aliphatic group or in an aromatic group. An ester group and a carboxylic acid group are not considered to be a ketone group because the carbonyl group is bonded to one carbon atom and an oxygen atom.

The term "sulfate" refers to a radical of the formula —$SO_4^{2-}$.

The term "sulfonate" refers to a radical of the formula —$SO_3^{2-}$.

The term "heteroatom-containing group" refers to a radical that contains at least one heteroatom that has replaced carbon in the backbone. The heteroatom is nitrogen, oxygen, or sulfur. The radical may be linear, branched, or cyclic, and may be aromatic or non-aromatic. Examples of heteroatom-containing groups include tetrahydrofuryl, furyl, pyridinyl, pyrrolidinyl, and poly(oxyethylene).

The term "substituted" refers to at least one hydrogen atom on the named radical being substituted with another functional group. An exemplary substituted alkyl group is a perhaloalkyl group, wherein one or more hydrogen atoms in an alkyl group are replaced with halogen atoms, such as fluorine, chlorine, iodine, and bromine. An aryl group may also be substituted with alkyl. Exemplary substituted aryl groups include methylphenyl and trifluoromethylphenyl.

It should be noted that many of the terms used herein are relative terms. For example, the terms "upper" and "lower" are relative to each other in location, i.e. an upper component is located at a higher elevation than a lower component in a given orientation, but these terms can change if the device is flipped. The terms "inlet" and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow fluids through an upstream component prior to flowing through the downstream component. It should be noted that in a loop, a first component can be described as being both upstream of and downstream of a second component.

For reference, normal seawater has a typical salt concentration of about 3.5 wt %. The osmotic pressure of seawater at 25° C. is about 30 atm (441 psi). Fluids with a higher concentration than seawater are commonly referred to as brine.

Systems and Methods

The systems and methods disclosed herein generally relate to photoactive directional solvent extraction (PDSE) processes, which use a photoactive extractant to separate an aqueous or gaseous solvent from a solute. This separation process is useful for applications such as water purification or metal extraction. The photoactive extractant is a photoisomerizing compound that changes its isomeric state when exposed to certain wavelengths of light, and can be used as an organic phase solvent. The photoactive extractant has different solubility or binding affinity between the two isomers (referred to herein as the "relaxed" or "activated"

states). In other words, the organic solvent/phase containing the photoactive extractant can be triggered to absorb or release the aqueous solvent or gaseous solvent or solute.

For example, the processes can be used to desalinate water. The organic phase would be selective for water molecules over dissolved salt molecules, and is immiscible in water or brines. Once pure water is dissolved in the organic phase, it is mechanically separated from the concentrated brine. The extraction of water may proceed until solubility limits of the dissolved salt are reached, leading to salt precipitation, which may be controlled by pH to ensure that the precipitates remain in the aqueous phase and do not mechanically associate with the organic phase. The water-loaded organic phase is then separated from the aqueous phase (now saturated with salt). The water-loaded organic phase then undergoes a temperature swing, whereby heating or cooling the organic phase changes the isomer, causing a change in its aqueous solubility, releasing the loaded water as a new desalinated aqueous phase. This desalinated water may still have some residual salinity, and the process may be done in multiple steps to obtain high purity water.

As another example, the processes can be used for metal extraction from water. The photoactive extractant binds the metal ion in one isomeric state, and releases the metal in the other isomeric state. The metal-contaminated aqueous phase can be mixed with the organic phase, and then exposed to light to cause binding of the solute (i.e. metal ions). The aqueous phase and the organic phase are then separated from each other to obtain an aqueous phase with a reduced metal concentration. The metal-loaded organic phase is then exposed to light to release the solute/metal ions. The metal ions may include scandium (Sc), titanium (Ti), vanadium (V), chromium (Cr), manganese (Mn), iron (Fe), cobalt (Co), nickel (Ni), copper (Co), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), lanthanum (La), hafnium (Hf), tantalum (Ta), tungsten (W), rhenium (Re), osmium (Os), iridium (Ir), platinum (Pt), gold (Au), mercury (Hg), actinium (Ac), cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), terbium (Tb), thulium (Tm), ytterbium (Yb).

The systems and methods discussed herein do not require changing the phase of the aqueous solvent, as occurs for example in distillation processes where the water is boiled to leave solutes behind. This reduces the energy consumption and heat requirements for water purification systems and extraction. For example, the heat of vaporization for water is 2257 J/g, while the specific heat is 4.184 J/g. Thus it takes more than 500 times as much energy to vaporize water than to heat it from the melting point to the boiling point. The systems and methods can operate at sub-boiling temperatures, thus reducing operational costs compared to many conventional thermal processes. More particularly, the systems and methods may be performed at temperature ranges below 100° C. (212° F.), and can be performed with alternative light and heat sources, such as solar heat exchangers. Further, the systems and methods disclosed herein do not require the use of sophisticated membranes that are subject to fouling, require a separate crystallization step, or recover heat poorly.

Systems

FIG. 1 is a schematic diagram illustrating one embodiment of a system 100 that can be used to purify a first fluid stream 110. The system 100 includes a mixing stage 120, a light exposure stage 150, and a first separation stage 170 fluidly connected together as illustrated via arrows.

Starting from the left side of FIG. 1, the mixing stage 120 receives the first fluid stream 110 from a fluid source. Here, the first fluid stream comprises an aqueous liquid component and one or more solutes. In particular embodiments, the fluid stream 110 may comprise an aqueous liquid component and a solute. In some embodiments, for example, the aqueous liquid component may be water and the solute may include salt. Other liquid components and solutes are contemplated. In some embodiments, the first fluid stream 110 may include more than one impurity or solute, which may be dissolved in the liquid component of the first fluid stream or be present as a precipitate. In specific embodiments, the first fluid stream can be brine or seawater, although other fluid streams are contemplated.

The mixing stage 120 also receives an organic solvent 130 that comprises a photoactive extractant. The organic solvent 130 should be immiscible in the aqueous liquid component of the first fluid stream 110. The photoactive extractant may be a photoisomerizing compound that changes conformation upon exposure to light of a certain wavelength.

The first fluid stream 110 and the organic solvent 130 are mixed together in the mixing stage to form a mixture 135 (heterogeneous or homogeneous) of the aqueous and organic phases. The mixing stage may be a mixing tank having at least two inlets (for the first fluid stream and the photoactive solvent) and at least one outlet. The mixing can be performed using impellers, stirrers, shakers, etc. The mixing stage may also be a static mixer.

Next, the mixture 135 is sent to the light exposure stage 150. The light exposure stage includes a light source 152, which provides light that includes a first wavelength. The mixture 135 is exposed to light from the light source to cause the photoactive extractant to transform from a "relaxed" isomer into an "activated" isomer. It is also possible to transform the photoactive extractant to an activated or relaxed state before mixing with the aqueous phase. In this example, the activated photoactive extractant has a second aqueous solubility that is greater than the first aqueous solubility of the relaxed photoactive extractant. This allows the activated photoactive extractant (of the organic phase) to absorb at least a portion of the aqueous liquid component of the first fluid stream 110. Put another way, the aqueous liquid component is stripped from the aqueous phase. The activated photoactive extractant should be selective for the aqueous liquid component over solute. As desired, the mixture may also be exposed to heat, which also increases liquid uptake and improves isomerization kinetics. This activated mixture is indicated with reference numeral 155.

The light exposure stage may be a solar heat exchanger having at least one inlet and at least one outlet. The light exposure stage includes a transparent material and should allow light to penetrate completely throughout the mixture to improve reaction kinetics. Mirrors/heliostats can also be used externally to the light exposure stage to focus greater amounts of light/heat as desired. It should be noted that the light source must provide light of at least the first wavelength, to cause the photoactive extractant to change isomerization states. This could be done, for example, using a laser of the appropriate wavelength. However, the light source can also provide light of other wavelengths, which can be used to heat the mixture. Thus, for example, concentrated sunlight is contemplated as a suitable light source as well.

The activated mixture 155 is then sent to a first separation stage 170, where the aqueous and organic phases are separated from each other. The aqueous phase is indicated with reference numeral 173, and has a higher concentration of solute compared to first fluid stream 110. The organic phase is indicated with reference numeral 175, and contains the activated photoactive extractant along with an absorbed portion of the aqueous liquid component. If desired, the aqueous phase 173 can be recycled to the mixing stage 120 for additional recovery of the aqueous liquid component. The first separation stage may be in the form of a settling tank, which permits the aqueous and organic phases to separate from each other.

The organic phase 175 is then sent to a second separation stage 190, where the aqueous liquid component is separated from the photoactive extractant. As previously described, the photoactive extractant is in its activated state. In the second separation stage, the photoactive extractant is changed back to its relaxed state, having a lower aqueous solubility. This can be done, for example, by removing the photoactive extractant from exposure to light of the first wavelength, or by exposing the activated photoactive extractant to light of a second different wavelength that causes the extractant to change back to the relaxed state. This causes the aqueous liquid component to be released. Changing the temperature of the organic phase (usually cooling it to a lower temperature) can also contribute to release of the aqueous liquid. The second separation stage may also be in the form of a settling tank, which permits the aqueous and organic phases to separate from each other. The resulting streams are a purified aqueous stream 193 and recovered organic phase containing the photoactive extractant (reference numeral 195). The organic phase 195 can be recycled back to the mixing stage 120 if desired. The purified aqueous stream 193 can serve as the input into the system 100 as well, if further purification is desired.

As illustrated here, the system may include a heat exchanger 180 between the first separation stage 170 and the second separation stage 190. The heat exchanger 180 receives the organic phase 175, which contains activated photoactive extractant and aqueous liquid component. The heat exchanger outputs an organic phase 185 that contains relaxed photoactive extractant and aqueous liquid component, which are then separated from each other in the second separation stage 190.

Figure 2:
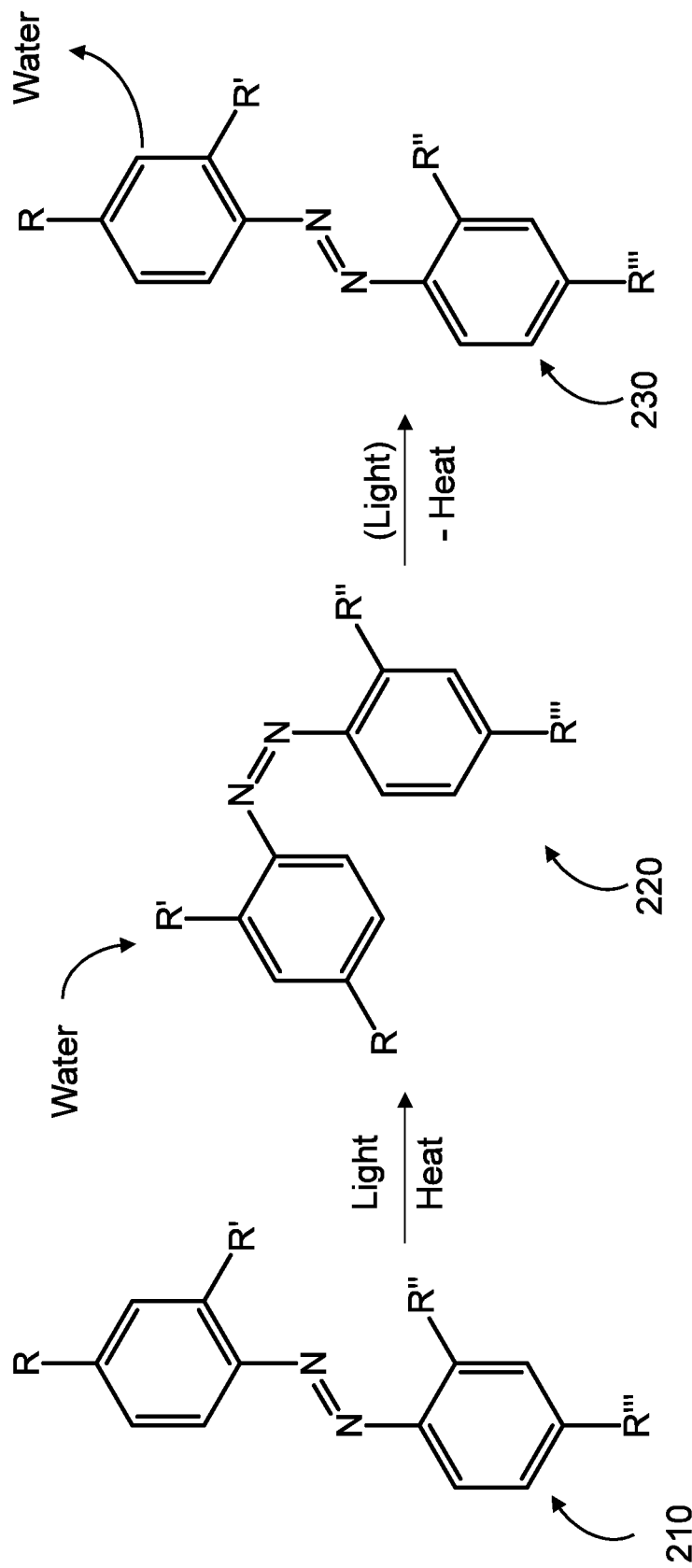
FIG. 2 illustrates the change in isomer for a photoactive extractant of the present disclosure.

FIG. 2 illustrates one example of the operation of the photoactive extractant. Here, the photoactive extractant is a molecule that has a first isomer 210 and a second isomer 220. The first isomer 210 may be considered the relaxed photoactive extractant, while the second isomer 220 may be considered the activated photoactive extractant. When the relaxed photoactive extractant 210 is exposed to light (and optionally heat), such as via the light exposure stage 150, the extractant undergoes a large conformational change, shown here as a trans-to-cis isomeric change. This also changes the extractant's affinity for water (i.e. aqueous solubility). In other words, the isomeric change in shape changes the polarity of the molecule and the access to water-binding sites, thereby effectively changing the solubility of water in the photoactive organic solvent 202. Thus, when the photoactive extractant is in its relaxed state 210, the extractant has a first aqueous solubility, and a second aqueous solubility when the photoactive extractant is in its activated state 220 (i.e. after being exposed to light). The second aqueous solubility is greater than the first aqueous solubility. In particular embodiments, the second aqueous solubility is at least 10 times greater, or at least 20 times greater, or at least 40 times greater, and up to 60 times greater than the first aqueous solubility. The extractant can be switched from its activated state 220 back to its relaxed state 230 by removing it from light exposure, exposing it to a different wavelength of light, or by removing heat. The wavelengths for activating/relaxing the extractant can be different from each other by at least 50 nm.

In the system of FIG. 1, the photoactive extractant has a relaxed state with a first aqueous solubility and an activated state with a second aqueous solubility, wherein the second aqueous solubility is greater than the first aqueous solubility. As a result, the photoactive extractant must be exposed to light to induce the separation process between the solvent and solute of the first fluid stream.

Figure 3:
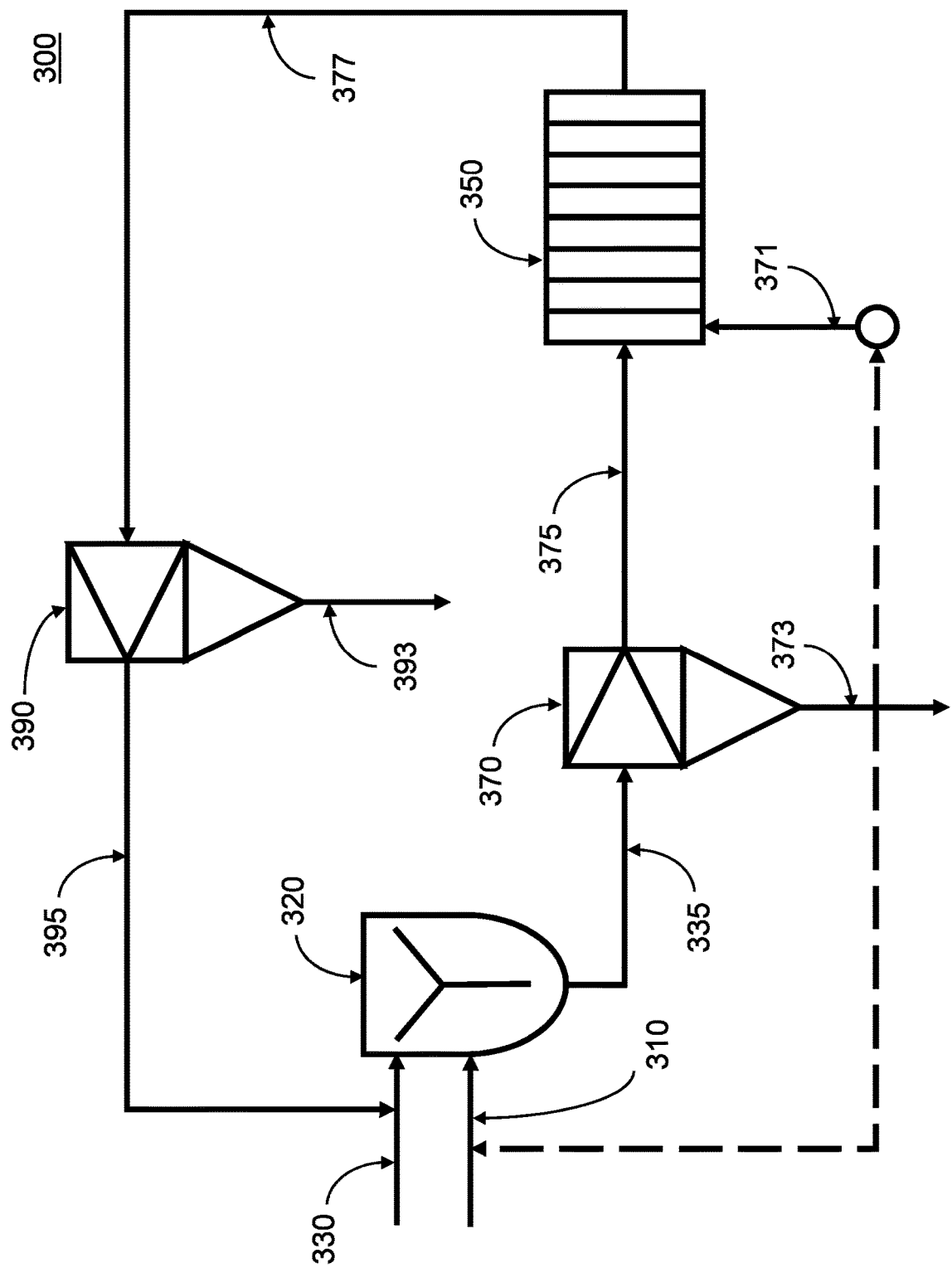
FIG. 3 illustrates a schematic for a second embodiment of the present disclosure, where light exposure causes release of a captured solute.

FIG. 3 illustrates a system 300 where the photoactive extractant has (A) a relaxed state with a first aqueous solubility or binding affinity, and (B) an activated state with a second aqueous solubility or binding affinity, wherein (C) the second aqueous solubility/affinity is less than the first aqueous solubility/affinity. In particular embodiments, the first aqueous solubility/binding affinity is at least 10 times greater, or at least 20 times greater, or at least 40 times greater, and up to 60 times greater than the second aqueous solubility/binding affinity.

This system also includes a mixing stage 320, a light exposure stage 350, a first separation stage 370, and a second separation stage 390. These components are fluidly connected together as illustrated via arrows. Here, the light exposure stage 350 is located between the first separation stage 370 and the second separation stage 390, rather than upstream of both separation stages. This example is illustrated where the photoactive extractant is used to bind and remove a solute (e.g. an anionic or cationic metal species) from an aqueous solution.

The first fluid stream 310 and the organic solvent 330 are mixed together in the mixing stage to form a mixture 335. Again, the first fluid stream comprises an aqueous liquid component and one or more solutes. The organic solvent 330 comprises a photoactive extractant. The photoactive extractant binds to the solute and remains in the organic solvent.

The mixture 335 flows to first separation stage 370, where the aqueous and organic phases are separated from each other. The aqueous phase is indicated with reference numeral 373, and has a lower concentration of solute compared to first fluid stream 310. The organic phase is indicated with reference numeral 375, and contains the relaxed photoactive extractant along with absorbed solute. The aqueous phase 373 can be considered "purified" relative to the first fluid stream 310. If desired, the aqueous phase 373 can be recycled to the mixing stage 320 for additional recovery of the solute.

The organic phase 375 containing relaxed photoactive extractant and absorbed/bound solute is sent to the light exposure stage 350. The organic phase 375 is exposed to light from the light source to cause the photoactive extractant to transform from the "relaxed" isomer into the "activated" isomer. As discussed above, in this example the activated photoactive extractant has a second binding affinity that is less than the first binding affinity of the relaxed photoactive extractant. The activated photoactive extractant thus releases the absorbed solute. An aqueous phase 371 is added to the first separation stage to receive the released solute. This aqueous phase 371 can be fresh liquid, or can be part of the aqueous phase 373 from the first separation stage. The mixture, now containing an aqueous phase with released solute and an organic phase containing activated photoactive extractant, is labeled with reference numeral 377.

The mixture 377 then flows to second separation stage 390, where the aqueous and organic phases are separated from each other. The aqueous phase is indicated with reference numeral 393, and has a higher concentration of solute compared to first fluid stream 310. The organic phase is indicated with reference numeral 395, and contains the photoactive extractant. The organic phase 395 is then treated to obtain relaxed photoactive extractant, which can subsequently be recycled to the mixing stage 320.

Figure 4:
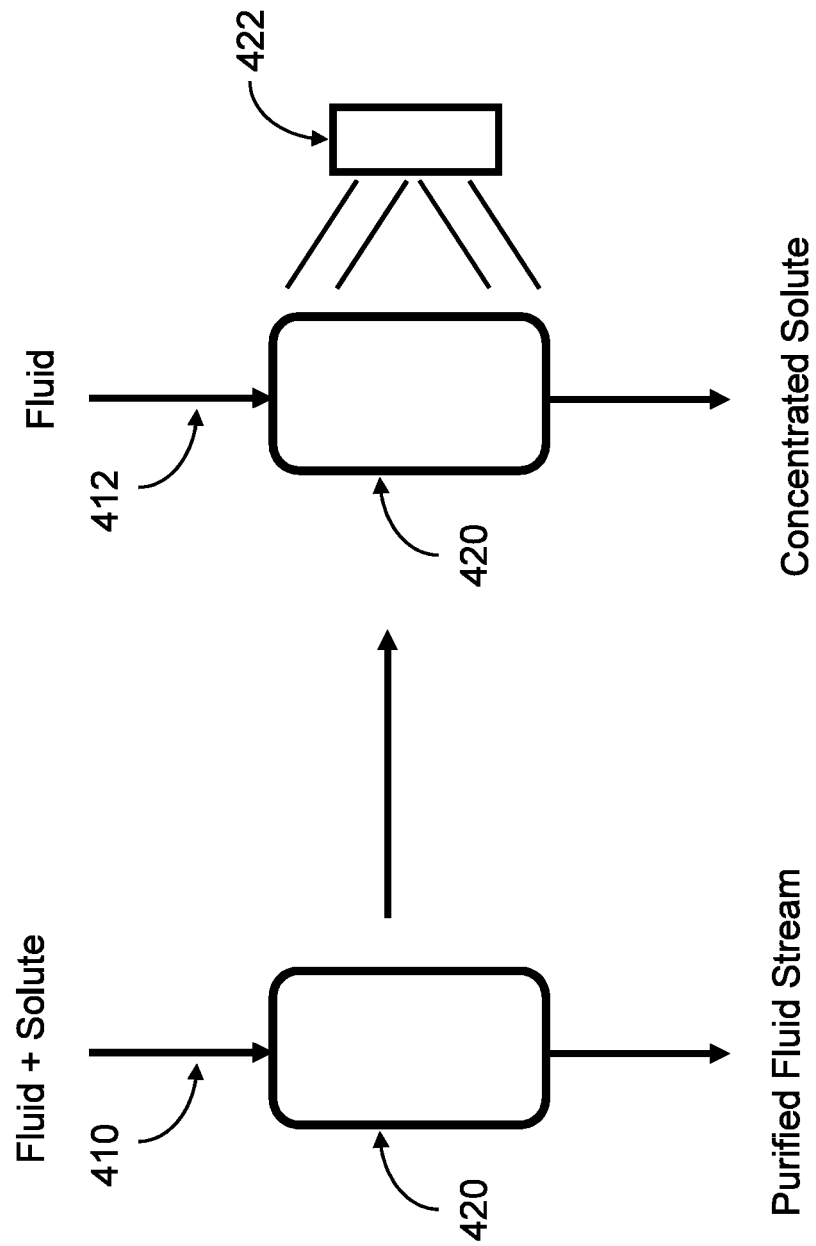
FIG. 4 is another embodiment of the present disclosure where the extractant is in a solid form in a column, and different fluids are flowed through the column before and after light exposure to purify the first fluid and capture solute in the second fluid.

FIG. 4 illustrates a system 400 where the photoactive extractant has (A) a relaxed state with a first aqueous solubility or binding affinity, and (B) an activated state with a second aqueous solubility or binding affinity, wherein (C) the second aqueous solubility/affinity is less than the first aqueous solubility/affinity. In this system, the photoactive extractant is a solid, i.e. fixed onto a support. In this embodiment, the overall system can act as an ion exchange resin, where different fluid streams are run past the photoactive extractant. This example is illustrated where the photoactive extractant is used to bind and remove a solute (e.g. an anionic or cationic metal species) from an aqueous solution.

The system 400 includes a column 420 to which the photoactive extractant is fixed or bound. The first fluid stream 410, comprising a liquid and solute, is run through the column. The photoactive extractant binds the solute, thus purifying the first fluid stream 410.

Next, the column 420 is exposed to light from light source 422 and a second fluid stream 412 is run through the column. This causes the photoactive extractant to transform from the "relaxed" isomer into the "activated" isomer. In this example, the activated photoactive extractant has a second binding affinity that is less than the first binding affinity of the relaxed photoactive extractant. The activated photoactive extractant thus releases the bound solute into the second fluid stream 412. It is contemplated that the volume of the second fluid stream 412 would be much less than that of the first fluid stream 410.

Methods

Figure 5:
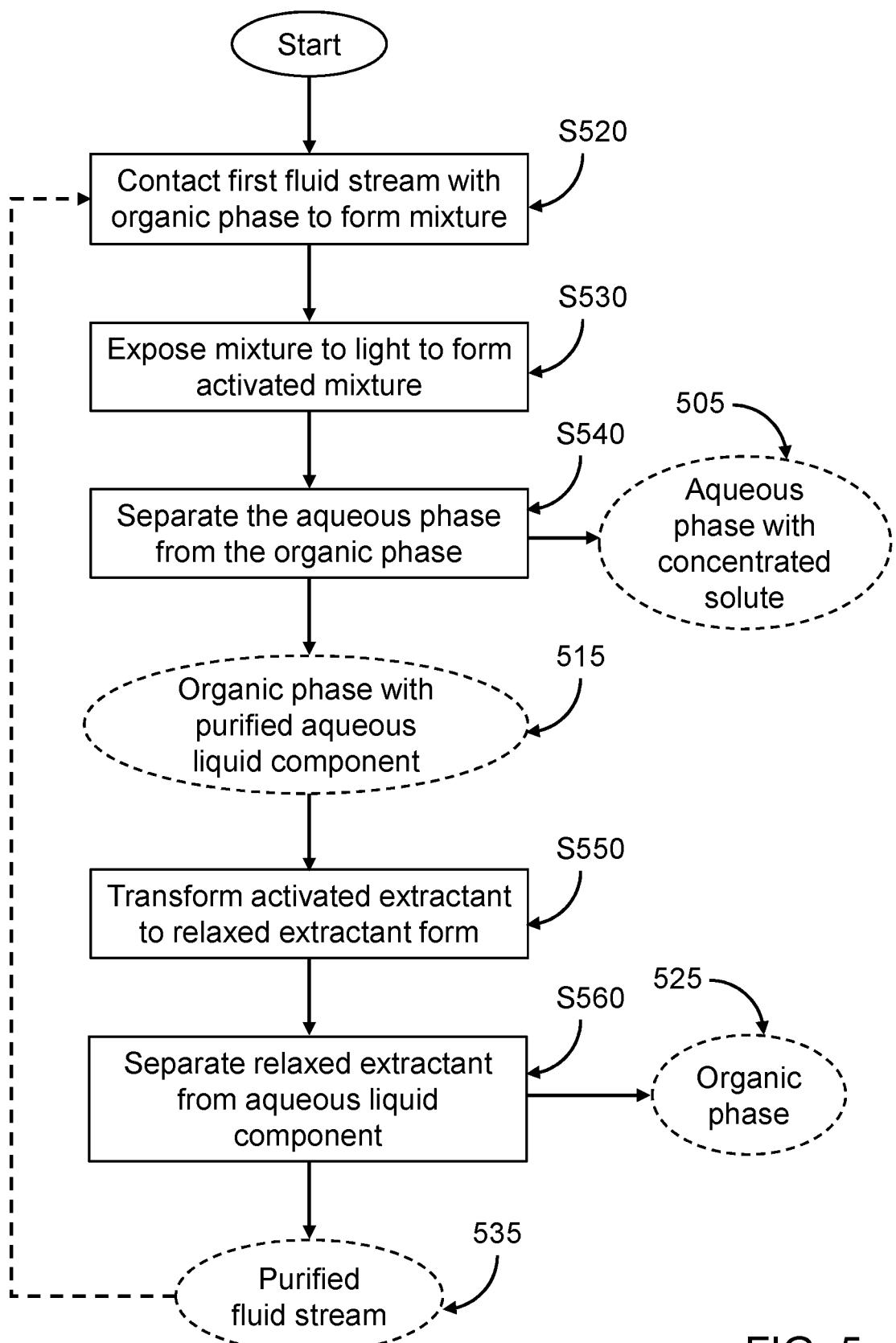
FIG. 5 is a flowchart illustrating one method of the present disclosure.

FIG. 5 is a flow chart illustrating one embodiment of a method 500 for purifying a first fluid stream to obtain a purified fluid stream, and corresponds to the schematic shown in FIG. 1. The method 500 begins at step S510. At step S520, the first fluid stream is contacted with an organic phase to form a mixture. In particular embodiments, the organic phase comprises a relaxed photoactive extractant having a first aqueous solubility. In further embodiments, step S520 may include mixing the first fluid stream and the organic phase. Step S520 may take place at an initial stage, such as a mixing tank or chamber. The first fluid stream can have an aqueous liquid component which is to be separated from a solute.

At step S530, the mixture is exposed to light having a first wavelength to obtain an activated mixture. The activated mixture comprises an activated photoactive extractant having a second aqueous solubility that is greater than the first aqueous solubility. In particular embodiments, the activated photoactive extractant is a photoisomer of the relaxed extractant, which undergoes photoisomerizing when exposed to light. Step S530 may occur at an intermediate stage. In particular embodiments, the intermediate stage may be a solar exchanger.

At step S540, the aqueous phase and the organic phase are separated from each other. The aqueous phase is indicated with reference numeral 505. The organic phase is indicated with reference numeral 515. The organic phase comprises the activated photoactive extractant, and a purified aqueous liquid component absorbed from the first fluid stream by the activated photoactive extractant. The purified aqueous liquid component is still bound to the activated photoactive extractant. Step S540 may occur at a first separation stage.

At step S550, the activated photoactive extractant in the organic phase 515 is transformed to a relaxed photoactive extractant. This can be accomplished by: removing the activated photoactive extractant from light exposure; exposing the activated photoactive extractant to light having a second wavelength different from the first wavelength; or by changing (i.e. decreasing) the temperature of the organic phase. After the transformation at step S550, the purified aqueous liquid component is no longer bound to the relaxed photoactive extractant in the organic phase.

At step S560, the purified aqueous liquid component is separated from the organic phase to obtain the purified fluid stream 535 and an organic phase 525 containing relaxed photoactive extractant.

If desired, the purified fluid stream 535 may be recycled and steps S520 through S560 may be repeated, to remove any residual solute. The organic phase 525 can also be recycled if desired.

Photoactive Extractants

The photoactive extractants used in the systems and methods of the present disclosure are now discussed in further detail.

The change in aqueous solubility/binding affinity of the photoactive extractant is due to photoactive groups present in the chemical structure of the photoactive extractant molecule. In particular embodiments, the difference in aqueous solubility of the photoactive extractant is at least 1% between the two isomers, and in other embodiments is at least 3%, or at least 5%, and may be as high as 10%.

Such groups will change their orientation and chemical structure in response to energy added by photons of a specific wavelength. The exact wavelength depends upon the structure of the molecule, and the photoactive groups that are used. It is envisioned that the wavelength of light could be provided by sunlight. In particular embodiments, it is contemplated that the wavelength that causes transition between the two isomers is from about 300 nm to about 500 nm.

For example, the trans-configuration of azobenzene can be converted to the cis-configuration upon exposure to light having a wavelength of 320-350 nm. The cis-configuration can then be converted back to the trans-configuration in the dark, or upon exposure to blue light with a wavelength of 400-450 nm, or upon heating.

Specific photoactive groups that may be present in the photoactive extractant molecule include a double bond. Other functional groups that may be present to provide binding sites for metals or water molecules include a carboxyl group; an organophosphate group; a phosphinate group; a phosphonate group; an ester group; an ether group; a hydroxyl group; a ketone group; a sulfate group; a sulfonate group; or a heteroatom-containing group.

In some specific embodiments, the photoactive extractant is an azobenzene having the structure of Formula (1):

Formula (1)

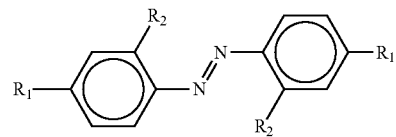

wherein $R_1$ is alkyl, substituted alkyl, alkoxy, or substituted alkoxy; and $R_2$ is hydroxyl or carboxyl.

In more general embodiments, the photoactive extractant is an azobenzene having the structure of Formula (A):

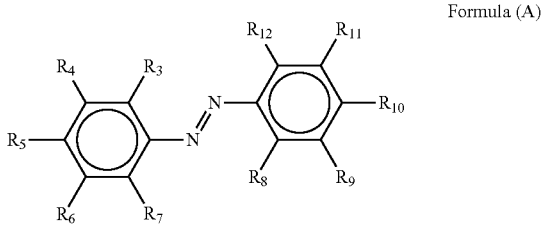

Formula (A)

wherein $R_3$-$R_{12}$ are independently selected from hydrogen, alkyl, substituted alkyl, alkoxy, substituted alkoxy, hydroxyl, carboxyl, nitro, halogen, amino, substituted amino, organophosphate, phosphinate, phosphonate, ester, ether, hydroxyl, ketone, sulfate, sulfonate, and a heteroatom-containing group. It is noted that Formula (1) is a subset of Formula (A).

In specific embodiments of Formula (A), each phenyl ring has at least one substituent selected from alkyl, substituted alkyl, alkoxy, or substituted alkoxy, and has at least one substituent selected from hydroxyl, carboxyl, nitro, halogen, amino, substituted amino, organophosphate, phosphinate, phosphonate, ester, ether, hydroxyl, ketone, sulfate, sulfonate, and a heteroatom-containing group.

In still other particular embodiments, the photoactive extractant is a stilbene having the structure of Formula (B):

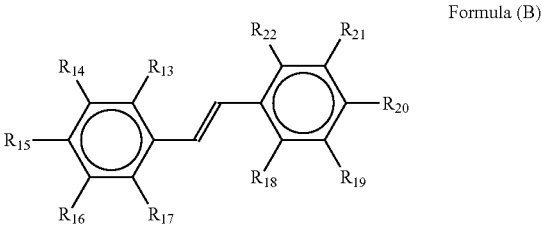

Formula (B)

wherein $R_{13}$-$R_{22}$ are independently selected from hydrogen, alkyl, substituted alkyl, alkoxy, substituted alkoxy, hydroxyl, carboxyl, nitro, halogen, amino, substituted amino, organophosphate, phosphinate, phosphonate, ester, ether, hydroxyl, ketone, sulfate, sulfonate, and a heteroatom-containing group.

In more specific embodiments of Formula (B), each phenyl ring has at least one substituent selected from alkyl, substituted alkyl, alkoxy, or substituted alkoxy, and has at least one substituent selected from hydroxyl, carboxyl, nitro, halogen, amino, substituted amino, organophosphate, phosphinate, phosphonate, ester, ether, hydroxyl, ketone, sulfate, sulfonate, and a heteroatom-containing group.

In yet more general embodiments, the photoactive extractant is a diarylethene having the structure of Formula (C):

Formula (C)

wherein $Ar_1$ and $Ar_2$ are aryl or substituted aryl. It is noted that Formula (A) and Formula (B) are subsets of Formula (C).

In particular embodiments, the photoactive extractant is a substituted azobenzene. These compounds are known to undergo a large conformational change (cis-to-trans) upon exposure to light in the range of about 300 nm to about 400 nm, and studies on the water solubility of azobenzenes found that their solubility in water can change by a factor of 40× between cis- and trans-forms, suggesting that with proper functionalization, the hydrophobic molecules can have a large swing in absorbed water. The azobenzene backbone can also be easily modified through addition of one or more ligands at specific locations on the molecule. The trans-to-cis isomerization can occur upon exposure to blue light (about 450 nm to about 490 nm), or in the dark.

Generally speaking, the extractant may be functionalized with appropriate side groups to optimize additional operational factors, such as water uptake, phase behavior, salt rejection, viscosity, water solubility, absorption wavelength, and binding strength. For example, side groups may be added to increase the change in the dipole moment of the photoactive extractant upon conformational change. As can be observed in FIG. 2, the photo-induced transformation of the trans conformation extractant 210 to the cis conformation extractant 220 does not significantly alter the charge associated with the nitrogen atoms or phenyl groups, but the orientation of those charges in extractant 220 leads to a large change in the net dipole moment.

Figure 6:
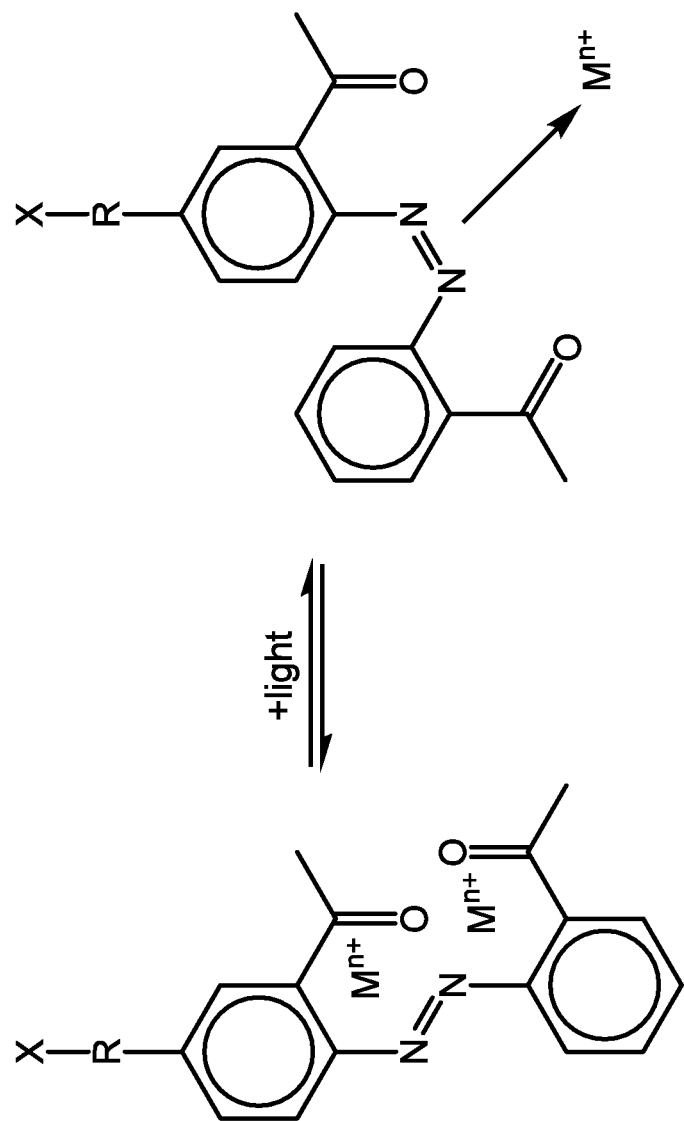
FIG. 6 illustrates a schematic for another embodiment of the present disclosure, where the photoactive extractant is used to capture metal ions.

An example of a metal extraction reaction is illustrated in FIG. 6. The left-hand side illustrates the trans-isomer, which is able to bind metal cations. Here, two different potential locations are illustrated where metal cations can be bound. When light is applied in a stripping step, as illustrated on the right-hand side, the cis-isomer is less able to bind the cation, releasing the cation back into solution. It is believed the light wavelength for the cis-trans transition is likely from about 300 nm to about 400 nm.

The R-X sidechain is intended to allow the photoactive extractant to be bonded to a solid support, such as polystyrene, to make a solid phase resin in order to reduce the soluble losses of the extractant compound. This is commonly done with ion exchange resins where an ionic functional group is fixed to beads made of polystyrene, silica, alumina, activated carbon, etc. R represents an alkyl group, and the 'X' is a functional group on the chain that can be reacted to bind to the solid support. For example, X may be a carboxyl, hydroxyl, or halide group.

The illustration of FIG. 6 is a simple example, and it should be noted that the concept illustrated is not limited to the use of ketone groups. In practice, the identity of the groups and the locations at which they are appended to the photoactive extractant can be rearranged to change the number of, distance between, and arrangement of available electron pairs for binding cations. It can also be adjusted so that cations bind in the cis configuration rather than the trans configuration. Generally, it should be easier to control the process conditions (e.g. clarity, concentration, flow, etc.) of a stripping solution compared to an extraction solution, making it easier and more efficient to apply light in a stripping step rather than during an extraction step.

Table 1 below shows the dipole moment in both cis and trans conformations of several azobenzene extractants with substitutions in the para-position (i.e. $R_1$), which illustrates that para-substitution for some extractants, such as azobenzene, has little effect on the dipole in the trans conformation, while the substitution can increase or decrease the dipole moment in the cis conformation.

TABLE 1

| $R_1$ | Trans-Conformation Dipole (Debye) | Cis-Conformation Dipole (Debye) |
|---|---|---|
| H | 0 | 3.35 |
| $OC_2H_5$ | 0.13 | 5.78 |
| $C_2H_5$ | 0 | 3.98 |
| $C_2F_5$ | 0 | 1.31 |

Alternatively, the extractant may have other substitutions, such as substitutions in the ortho-position (i.e. $R_2$). As can be seen in Table 2 below, the ortho-substitution in azobenzene has significant impact on the extractant's dipole moment in the trans conformation:

TABLE 2

Dipole Moment for Trans-Azobenzene with $R_1$ = H.

| $R_2$ | Orientation of $R_2$ groups | Dipole (Debye) |
|---|---|---|
| OH | Same side | 2.73 |
| OH | Opposite | 0.95 |
| COOH | Same side | 4.06 |
| COOH | Opposite | 0 |

As can be seen in Table 2, the conformation with the $R_2$ groups on opposite sides may have lower dipole moments than when the $R_2$ groups are on the same side of the molecule. Furthermore, this trend may be independent of additional substitutions, such as substitutions in the $R_1$ position, as can be seen Table 3 below:

TABLE 3

Dipole Moment for Trans-Azobenzene with $R_1$ = $C_2H_5$.

| $R_2$ | Orientation of $R_2$ groups | Dipole (Debye) |
|---|---|---|
| OH | Same side | 2.79 |
| OH | Opposite | 0.88 |
| COOH | Same side | 7.20 |
| COOH | Opposite | 0.29 |

The photoactive extractant may also be selected based on the interaction energy of the extractant. For example, with azobenzene derivatives that have no substitution at the $R_1$ position, or where the $R_1$ substitution is non-polar, water molecules will interact primarily with the central portion of the molecule. However, substitution of a polar group at the $R_2$ positions may enhance the interaction between the water and azobenzene, and may increase the change in binding strength between the trans and cis conformations. This effect may be seen in Table 4 below:

TABLE 4

Effect of $R_2$ Substitution on Interaction Energy with $R_1$ = H.

| $R_2$ | Trans- conformation Interaction Energy (kcal/mol) | Cis- conformation Interaction Energy (kcal/mol) |
|---|---|---|
| —H | −5.0 | −6.6 |
| —OH (OH on same side) | −6.3 | −11.2 |
| —OH (OH on opposite sides) | −6.7 | −3.4 (no H-bond to water) |
| —COOH (COOH on same side) | −10.6 | −13.6 |
| —COOH (COOH on opposite sides) | −12.8 | −9.3 |

As can be seen, the inclusion of a polar ligand at $R_2$ may increase the strength of the interaction between water and azobenzene molecules. Further, where no hydrogen bond is formed between the water and hydroxyl ligand, the water is only weakly bound with the azobenzene. Further substitution, such as the addition of an ethyl group at the $R_1$ position has little impact on the interaction between a water molecule and the azobenzene, as shown in Table 5:

TABLE 5

Effect of $R_2$ Substitution on Interaction Energy with $R_1$ = $C_2H_5$.

| $R_2$ | Trans- conformation Interaction Energy (kcal/mol) | Cis- conformation Interaction Energy (kcal/mol) |
|---|---|---|
| —H | −5.2 | −6.7 |
| —OH (OH on same side) | −6.2 | −14.6 |
| —OH (OH on opposite sides) | −6.9 | −3.1 (no H-bond to water) |
| —COOH (COOH on same side) | −11.6 | −10.1 |
| —COOH (COOH on opposite sides) | −12.7 | −10.5 |

As discussed above, the photoactive extractant can exposed to light to drive the transition of the extractant between cis- and trans-isomers. In particular embodiments, the light source used may be the sun.

In some embodiments, the extractant may be selected based on the available light sources. For example, a photoactive extractant may be selected with certain substitutions or specifically functionalized to have wavelength of maximum absorption. The effect of various $R_1$ substitutions on the wavelength absorption strength are shown below for azobenzene:

TABLE 6

Effect of $R_1$ Substitution on $\lambda_{max}$

| $R_1$ | Trans- conformation $\lambda_{max}$ (nm) | Cis- conformation $\lambda_{max}$ (nm) |
|---|---|---|
| H | 318 | 272 |
| $C_2H_5$ | 332 | 321 |
| $C_2F_5$ | 319 | 305 |
| $OC_2H_5$ | 355 | 298 |

As can be seen, the trans-isomer absorbs at a longer length than the cis-isomer. Additionally, substitutions at the $R_1$ position can cause an increase in maximum wavelength absorption ($\lambda_{max}$), particularly for the alkoxyl ligand. Further, it is believed that that substitutions at the $R_1$ position using strong withdrawing groups, such as cyano or nitro groups, may cause the $\lambda_{max}$ to shift by 100 nanometers or more. However, the use of such strong acceptor groups may reduce the difference in water uptake between the trans and cis isomers (i.e. the amount of liquid absorbed by the photoactive extractant after being exposed to light).

Substitutions affecting wavelength absorption strength may also be made at other positions, including the $R_2$ position. This effect can be seen in the following Tables 7 and 8:

TABLE 7

Effect of $R_2$ Substitution on $\lambda_{max}$ for $R_1$ = H.

| $R_2$ | Trans-conformation $\lambda_{max}$ (nm) | Cis-conformation $\lambda_{max}$x (nm) |
|---|---|---|
| —H | 318 | 272 |
| —OH (OH on same side) | 372 | 289 |
| —OH (OH on opposite sides) | 333 | 344 |
| —COOH (COOH on same side) | 335 | 308 |
| —COOH (COOH on opposite sides) | 322 | 291 |

TABLE 8

Effect of $R_2$ Substitutions on $\lambda_{max}$ for $R_1$ = —OC$_2$H$_5$

| $R_2$ | Trans-conformation $\lambda_{max}$ (nm) | Cis-conformation $\lambda_{max}$ (nm) |
|---|---|---|
| —H | 355 | 321 |
| —OH (OH on same side) | 364 | 313 |
| —OH (OH on opposite sides) | 332 | 338 |
| —COOH (COOH on same side) | 366 | 339 |
| —COOH (COOH on opposite sides) | 395 | 332 |

Additionally, the photoactive extractant may exhibit a phase change behavior, such as a change in phase from isotropic to nematic, which may further increase the difference between the aqueous solubility of the relaxed photoactive extractant and the activated photoactive extractant. In particular embodiments, the extractant may be exposed to a pulse of light that induces a phase change, such as, for example, from isotropic to nematic, or from nematic to isotropic.

Additionally, the photoactive extractant may exhibit a unique phase behavior as a function of temperature and cis/trans ratio. For example, it is believed that certain photoactive extractants may exhibit a change in phase from isotropic to nematic, which may further increase the difference between the aqueous solubility of the relaxed photoactive extractant and the activated photoactive extractant. In particular embodiments, the photoactive extractant may be exposed to a pulse of light to drive the phase transition and enhance the liquid absorption properties of the photoactive solvent.

All calculations presented in Table 1-8 were performed using Spartan '14. Structures were built, then the minimum energy conformation was calculated at the B3LYP/6-311+G** level. Interaction energies were calculated as the difference in energy between the energy of the optimized complex and the energy of the optimized individual components. Absorption spectra for the optimized structures were determined using the TDDFT/TDA module within Spartan '14, using the same basis set.

As another example, a photoactive extractant in a cis-configuration may bind more strongly with a copper ion than when in the trans-configuration. Accordingly, causing this transformation with light can effect extraction and stripping of copper without chemical additions. This may be done with any other number of metal species, cationic or anionic, by functionalizing the photoactive extractant with different active groups in different arrangements. In some cases, the photoactive conformational effect may be augmented with chemical or thermal additions, but it will reduce the consumption of chemicals or heat. This would be especially advantageous in mining, which is frequently done in remote locations where logistics of fuel or chemical delivery are challenging.

By fixing the photoactive extractant onto a support, such as a solid phase ion exchange resin, the support could act as a solid phase sorbent that is loaded or stripped using light. Conventional resins periodically need regeneration, often with large volumes of chemicals or heat inputs. Adsorption or desorption of a solid phase photoactive extractant compound could be done using light, reducing chemical or fuel costs. This may be especially useful in remote locations, or in cases where it is difficult to get selectivity for a trace compound (like in selenium or arsenic) over other components in the stream. Light can be used to regenerate the sorbent rather than chemicals, reducing the cost for regeneration and minimizing the concern for competing ions in the stream. This could similarly be done with solid phase adsorbents in gas phase processes, where a gas binds more strongly in the cis or trans conformation, and it is released upon exposure to light.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

What is claimed is:

1. A method of capturing a solute that is present in a first fluid stream, comprising:
    contacting the first fluid stream with a photoactive extractant to absorb the solute;
    separating the photoactive extractant from the first fluid stream; and
    stripping the absorbed solute from the photoactive extractant to obtain the captured solute;
    wherein the photoactive extractant is exposed to light having a first wavelength during either the contacting or the stripping, which changes a binding affinity of the photoactive extractant for the solute from a first binding affinity to a second binding affinity; and
    wherein the binding affinity of the photoactive extractant is changed back to the first binding affinity by changing the temperature of the photoactive extractant.

2. The method of claim 1, wherein the photoactive extractant is exposed to the light having the first wavelength during the stripping, and wherein the second binding affinity is less than the first binding affinity, such that the absorbed solute is stripped from the photoactive extractant.

3. The method of claim 1, wherein the photoactive extractant is exposed to the light having the first wavelength during the contacting, and wherein the second binding affinity is greater than the first binding affinity, such that at least a portion of the solute is absorbed by the photoactive extractant.

4. The method of claim 1, wherein the photoactive extractant is an azobenzene, a stilbene, or a diarylethene.

5. The method of claim 1, wherein the photoactive extractant is an azobenzene having the structure of Formula (A):

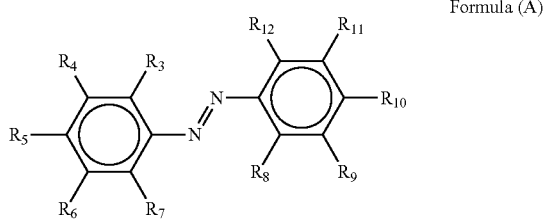

Formula (A)

wherein $R_3$-$R_{12}$ are independently selected from hydrogen, alkyl, substituted alkyl, alkoxy, substituted alkoxy, hydroxyl, carboxyl, nitro, halogen, amino, substituted amino, organophosphate, phosphinate, phosphonate, ester, ether, hydroxyl, ketone, sulfate, sulfonate, and a heteroatom-containing group.

6. The method of claim 1, wherein the photoactive extractant is a stilbene having the structure of Formula (B):

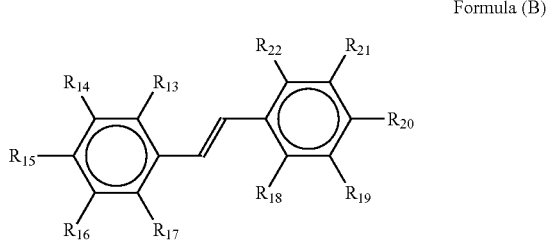

Formula (B)

wherein $R_{13}$-$R_{22}$ are independently selected from hydrogen, alkyl, substituted alkyl, alkoxy, substituted alkoxy, hydroxyl, carboxyl, nitro, halogen, amino, substituted amino, organophosphate, phosphinate, phosphonate, ester, ether, hydroxyl, ketone, sulfate, sulfonate, and a heteroatom-containing group.

7. The method of claim 1, wherein the first wavelength is from about 300 nm to about 500 nm.

8. The method of claim 1, wherein the solute is salt (NaCl) or a metal species.

9. A method of capturing a solute that is present in a first fluid stream, comprising:
   contacting the first fluid stream with a photoactive extractant to absorb the solute;
   separating the photoactive extractant from the first fluid stream; and
   stripping the absorbed solute from the photoactive extractant to obtain the captured solute;
   wherein the photoactive extractant is exposed to light having a first wavelength during either the contacting or the stripping, which changes a binding affinity of the photoactive extractant for the solute from a first binding affinity to a second binding affinity; and
   wherein either the photoactive extractant is fixed upon a support, or the photoactive extractant is a solid.

10. The method of claim 1, wherein the first fluid stream is a gas or a liquid.

11. The method of claim 1, wherein the light having a first wavelength is concentrated sunlight.

12. A system for separating a solute from a first fluid stream, comprising:
   a source for a photoactive extractant;
   a mixing stage for receiving and mixing the photoactive extractant with the first fluid stream to form a mixture;
   a light exposure stage;
   a first separation stage;
   a second separation stage downstream of the first separation stage; and
   a heat exchanger between the first separation stage and the second separation stage.

13. The system of claim 12, wherein the light exposure stage is a solar heat exchanger, or includes a laser.

14. The system of claim 12, wherein the first separation stage is a settling tank.

15. The system of claim 12, wherein the light exposure stage is upstream of the first separation stage.

16. The system of claim 12, wherein the first separation stage is upstream of the light exposure stage.

17. The system of claim 12, wherein the second separation stage is a settling tank.

18. The system of claim 12, further comprising a recycle line for returning photoactive extractant to the mixing stage.

* * * * *